United States Patent
Rosenthal

(10) Patent No.: US 6,341,742 B1
(45) Date of Patent: Jan. 29, 2002

(54) LINE TIGHTENER

(76) Inventor: Ronald L. Rosenthal, 1904 Jefferson Hwy., Fisherville, VA (US) 22939

(*) Notice: Subject to any disclaimer, the term of this patent is extended or adjusted under 35 U.S.C. 154(b) by 0 days.

(21) Appl. No.: 09/594,385

(22) Filed: Jun. 15, 2000

Related U.S. Application Data

(60) Provisional application No. 60/139,292, filed on Jun. 15, 1999.

(51) Int. Cl.$^7$ ................................................ B65H 75/38
(52) U.S. Cl. .................................................. 242/388.2
(58) Field of Search ............................... 242/388, 388.2, 242/388.3, 388.4, 388.5, 405.1; 254/217, 213, 214, 223, 369; 24/68 R, 69 R, 70 R, 70 CT, 70 ST, 69 ST, 71.2, 68 CD, 19

(56) References Cited

U.S. PATENT DOCUMENTS

| | | | | |
|---|---|---|---|---|
| 1,292,867 A | * | 1/1919 | Penning | |
| 1,472,167 A | * | 10/1923 | Grimme | |
| 1,570,291 A | * | 1/1926 | Van Alstine | 242/388.2 X |
| 2,048,300 A | * | 7/1936 | Showers | |
| 2,204,939 A | * | 6/1940 | Lyons | 242/388.2 X |
| 2,229,003 A | * | 1/1941 | Fly | 242/388.2 |
| 3,128,106 A | * | 4/1964 | Zinkel, Jr. | |
| 3,879,805 A | * | 4/1975 | Gretter | |

FOREIGN PATENT DOCUMENTS

| | | | | |
|---|---|---|---|---|
| FR | 372570 | * | 4/1907 | 242/388.2 |
| FR | 548790 | * | 1/1923 | 242/388.2 |

* cited by examiner

*Primary Examiner*—William A. Rivera
(74) *Attorney, Agent, or Firm*—Sheldon H. Parker

(57) ABSTRACT

A line tightening device, for use in removing slack from a flexible line has a plate-like body member. The body member has a pair of spaced holes and a pair of opposing ends. The holes are between the ends of the member. One end is bent generally at a right angle to the body member. At least one line receiving groove is provided along an edge of the bent up region. A flexible rope or line is strung through the pair of holes. The rotation of the body member in a first direction, around an axis substantially perpendicular to said first plane winds the flexible line around itself along an axis substantially midway between said two holes. This is repeated until the flexible line is taut. Then the flexible line is locked into one of the line receiving grooves. The line receiving groove is on the side of the body member that faces away from said direction of rotation, such that the device cannot unwind.

9 Claims, 2 Drawing Sheets

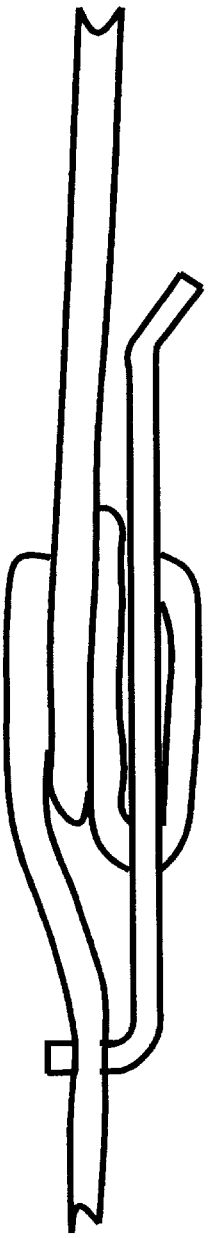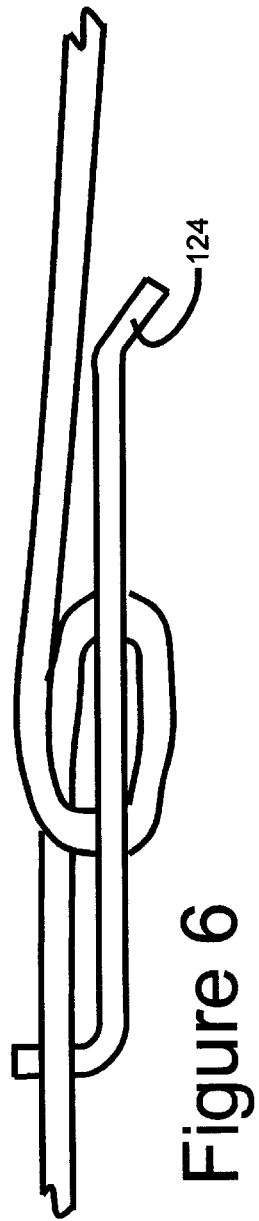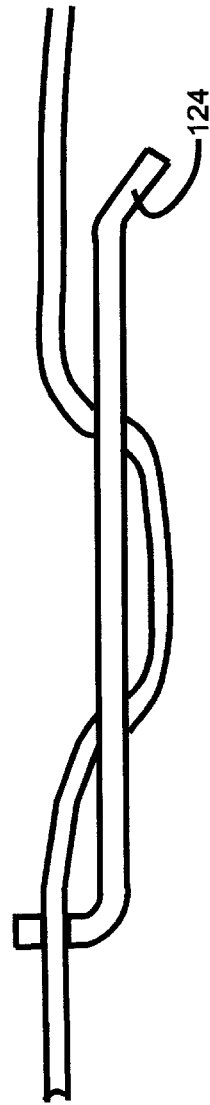

LINE TIGHTENER

Cross Reference to Related Applications

The present application claims the benefits under 35 U.S.C. 119(e) of provisional patent application Ser. No. 60/139,292, filed Jun. 15,1999. This application incorporates by reference, as though recited in full, the disclosure of co-pending provisional application No. 60/139,292.

BACKGROUND OF THE INVENTION

1. Field of the Invention

The invention relates to a rope tightening device, and more particularly, to a device for taking up the slack in a rope, or other type of cord member.

2. Brief Description of the Prior Art

There are many designs for devices for rope tightening and slack removal. One such device is disclosed in U.S. Pat. No. 3,711,901. The device has a central body portion, which forms a spool on which the slack in a rope may be wound. The side edges of the central body portion has a plurality of hooks which extend in opposite directions, and is provided with locking portions at the ends of the body. The device relies upon a complex wrapping pattern, to produce the desired effect. U.S. Pat. No. 2,577,212 is a simpler device than the foregoing noted patent, but relies upon a tightening lever to apply sufficient pressure to provide a positive locking effect.

U.S. Pat. No. 3,874,638 is a simple to use device, but can be tightened in a single direction only, and is of a complex design, from the standpoint of manufacture of the device.

U.S. Pat. No. 3,879,805 is a device of very simple design. It employs a bent wire and thus is either not capable of use with heavy forces, or must be made of a wide diameter wire or bend rod, and thus, not of an inexpensive design. In the modification of FIG. 10 of the patent, the device is illustrated as having an elongated body which is in the shape of a flat plate and is provided with holes at end thereof an hook at the other end. The hook relies on the strength of the flat plate, at the bend where hook 16A meets the body portion 11A. The device either would be subject to the hook bending under a load, or would require the use of a heavy gauge metal.

Devices for line tightening, or slack removal, are typically used for outdoors and camping related activities. Additional applications include the tightening of a rope and line used to secure an article to the roof of a car. Tarpaulin and tent tie downs are additional applications for rope tighteners.

The devices must be rugged, easy to use, and very low cost to manufacture. While the devices of the prior art fulfill some of these requirements, none of the devices meets all of the needs of the market place.

SUMMARY OF THE INVENTION

The line tightening device of the present invention is used for removing slack from a line, that is, for line tightening. The device includes a body member. The body member is a plate-like member, having a pair of spaced holes and a pair of opposing ends. The holes are positioned between the ends and are preferably space about one inch center to center. The first of the ends is bent in about the top surface of said plate-like member, so as to lie in a plane which is at an angle to the plane of said plate-like member. The first end preferably is in a plane that forms about a 90 degree angle with respect to the plane of the body of the device. The first end has at least one line receiving groove along an edge. Preferably, a line receiving groove is formed in each edge, forming a pair of opposing line receiving and retaining grooves. The line receiving and retain grooves preferably have a width of at least approximately one quarter of an inch.

The second of the ends is preferably bent in the direction opposite that of the first end. That is, it is bent about the bottom surface of said plate-like member, thereby extending away from the plate-like member in the direction opposite of that of the first bent end. The second of the ends is preferably bent about the bottom surface of said plate-like member, thereby pointing away from said bent first end and forming an enclosed angle of about 125 to about 145 degrees.

The use of the device includes the stringing of a rope or other flexible line through the pair of holes in the body member and then rotating the body member in a first direction, around an axis substantially perpendicular to the plane of the body member. The line is thus wrapped around itself along an axis roughly midway between the two holes. This step is repeated until the flexible line is taut. Then the flexible line is positioned in one of the line receiving grooves. The line receiving groove is on the side of the body member that faces away from said direction of rotation, such that the line is taut and slack is essentially eliminated.

BRIEF DESCRIPTION OF THE DRAWINGS

FIG. 5 is a side view of the line tightener of the present invention, shown with a line threaded through the line tightener.

FIG. 6 is a side view of the line tightener of the present invention, shown with a line threaded through the line tightener after the tightener has been twisted one revolution.

FIG. 7 is a side view of the line tightener of the present invention, shown with a line threaded through the line tightener after the tightener has been twisted several revolutions.

DESCRIPTION OF THE PREFERRED EMBODIMENTS OF THE INVENTION

It should be noted that while the term rope is most frequently used herein, the term is intended to be inclusive of terms such as cable, cord, line and twine.

Figure 4:
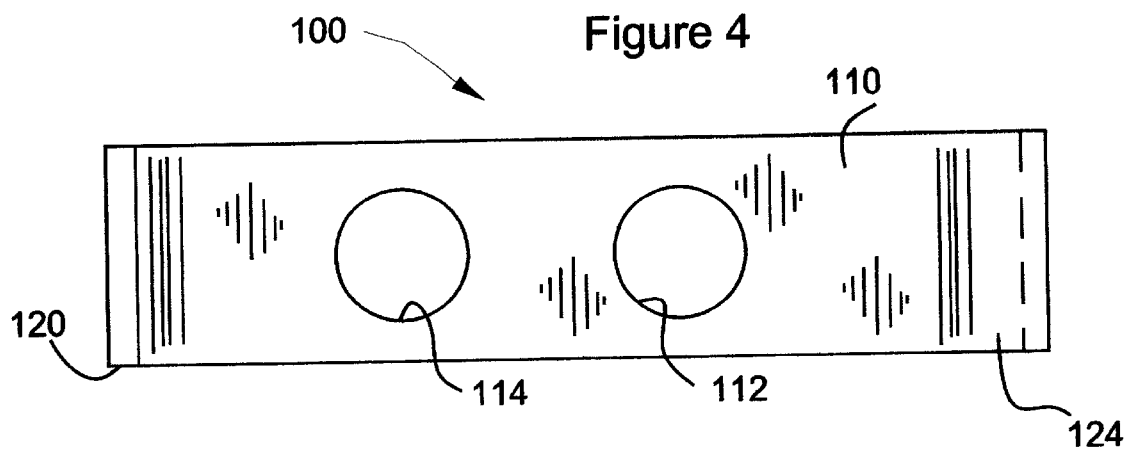
FIG. 4 is a top plan view of the tightener of FIG. 1.
Figure 2:
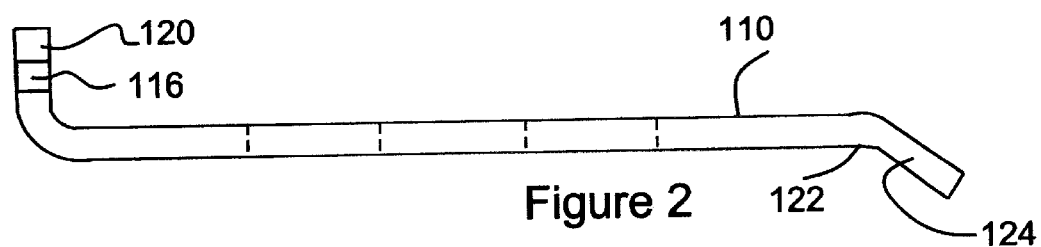
FIG. 2 is a side view of the tightener of FIG. 1.
Figure 3:
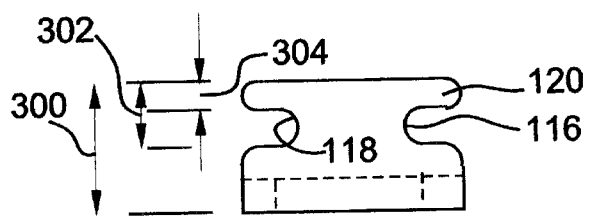
FIG. 3 is an end view of the tightener of FIG. 1.
Figure 1:
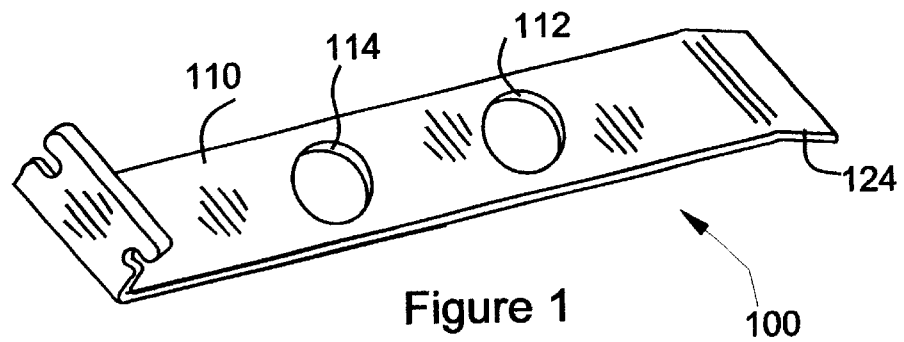
FIG. 1 is a perspective view of the line tightener of the present invention

As shown in FIG. 1, the line tightener of the present invention, indicated generally as 100, is in the form of a single piece of bent metal plate. The body portion 110, is provided with a pair of holes 112 and 114. One end 124, of the body member 110, is bent downwardly at point 122. The other end 120, is bent upwardly, preferably at about a right angle to the plane of the body portion 110. The upraised end 120 is provided with a pair of line receiving grooves 116 and 118. The width 302, of the grooves, is sufficiently large to accommodate the line that is to be tightened. The width of the line receiving groove 302 can conveniently be about an eighth of an inch, that is, about three or four millimeters, for light weight ropes. When used with thick ropes, as for example clothes lines of one quarter inch diameter, the groove and the other dimensions, are correspondingly larger. The bent end 124 can be offset from the plane of the body by roughly 135 degrees. The height of the raised section 120, is not narrowly critical, but preferably, is about one half inch, or about 12 or 13 millimeters.

The holes 112 and 114 need only be large enough to accommodate a single width of the rope, but can be larger, if desired. A hole diameter of about one third of an inch provides the desired clearance for a typical rope. In metric units, the hole diameter can be roughly 10 millimeters. It should be understood that the width of the grooves, or recesses, 116 and 118, need not be as large as the diameter of the rope to engage the rope, but it is preferred that the rope be totally received by the grooves.

The device can have a length, from end 120 to end 124 of about 3 or 4 inches, that is from about 7 to about 9 centimeters. The length is not narrowly critical, but the aforenoted dimensions will most preferably provide the desired results. The minimum width of the tightener is limited by the diameter of the holes. The width is preferably at least about 0.525 inch where the hole is 0.375 of an inch in diameter. Greater widths, or thickness, can be used for greater rigidity.

The holes are conveniently spaced about one inch, center to center. The thickness of the sheet material of the tightener is dictated by material strength. The device can be formed from plastics, cast iron, steel or other material, as for example, aluminum and composite plastics. The material selection is primarily based on economic requirements, that is, material cost and cost of manufacture.

As illustrated in FIG. 5, a rope is threaded through the tightener and is thus maintained on the rope at all times. The device is not subject to being lost, inadvertently, since it is secured to the rope. The device is rotated in either direction, to wrap the line around itself, as illustrated in FIG. 6. The process is repeated, as illustrated in FIG. 7, to further remove slack from the line, and can be repeated until the line is taut.

The plate-like member can be formed as an extrusion, with the holes formed post extrusion, preferably as the extrusion is slit into narrow, roughly half inch wide bands. Alternatively, the plate-like member can be stamped from metal plates, with the holes, grooves and bends being formed during a two stage stamping operation. The stamping operation can also include the step of cutting the plate into a plurality of narrow line tighteners.

In an alternative process, the holes and line receiving grooves can be formed during a stamping operation, followed by a bending step. Preferably, a plurality of units is formed during the stamping operation, and thus a step must be included to separate the plurality of units, into individual units.

It should be understood that while the line tightening device is shown having line receiving groove at one edge, there can be a groove at each of the two opposite edges. In such an embodiment, there can be a single groove at each edge with the two edges being mirror images of each other. In that manner, the groove at one edge would serve to prevent the unwinding where the line is twisted clockwise, and the opposite edge groove would serve to prevent the unwinding where the line is twisted counter clockwise.

What is claimed is:

1. A line tightening device, for use in removing slack from a flexible line, comprising, a body member, said body member being a plate-like member, having a pair of spaced line receiving holes and a pair of opposing ends, said line receiving holes being positioned between said ends, a first of said ends being bent in a first direction about the top surface of said plate-like member, with respect to the plane of said plate-like member and having at least one line receiving groove along an edge, and a line member, said line member being strung through said line receiving holes and engaging said at least one line receiving groove.

2. The line tightening device of claim 1, wherein the second of said ends is bent about the bottom surface of said plate-like member, thereby pointing away from said bent first end.

3. The line tightening device of claim 1, wherein the second of said ends is bent about the bottom surface of said plate-like member, thereby pointing away from said bent first end and forming an enclosed angle of about 125 to about 145 degrees.

4. The line tightening device of claim 1, wherein the first of said ends is bent about the top surface of said plate-like member, forming an enclosed angle of about 80 to about 100 degrees.

5. The line tightening device of claim 1, wherein the other of said ends is bent about the bottom surface of said plate-like member, thereby pointing away from said bent first end and forming an enclosed angle of about 125 to about 145 degrees and wherein the first of said ends is bent about the top surface of said plate-like member, forming an enclosed angle of about 80 to about 100 degrees.

6. The line tightening device of claim 1, wherein said holes are space about one inch center to center.

7. The line tightening device of claim 1, wherein said first end has a line receiving grooves in each edge, forming a pair of opposing line receiving and retaining grooves.

8. The line tightening device of claim 7, wherein said line receiving and retain grooves have a width of at least about one eighth of an inch.

9. The method of removing slack from a flexible line, comprising the steps of:

stringing a line through a pair of holes in a body member, said body member being a plate-like member, having a pair of spaced holes and a first end and a second end, said first end and said second end being opposing each other, said holes being positioned between said ends, a first end region being bent along a bend region, in a first direction about the top surface of said plate-like member with respect to the plane of said plate-like member, and having at least one line receiving groove along an edge of said first end region, said at least one line receiving groove being between said bend region and said first end;

said plate-like member lying in a first plane;

rotating said body member in a first direction, around an axis substantially perpendicular to said first plane and winding said flexible line around itself along an axis substantially midway between said two holes;

repeating the step of rotating said body member and winding said flexible line around itself until said flexible line is taut:

positioning said flexible line in one of said at least one line receiving groove, said one of said at least one line receiving groove being on the side of said body member that faces away from said direction of rotation, whereby said flexible line is prevented from unwinding.

* * * * *